(12) United States Patent
Parman et al.

(10) Patent No.: US 11,958,636 B2
(45) Date of Patent: Apr. 16, 2024

(54) DYNAMICALLY ADJUSTED ALIGNMENT BETWEEN PAYLOAD AND SPACECRAFT

(71) Applicant: MOMENTUS SPACE LLC, San Jose, CA (US)

(72) Inventors: Matthew Parman, Mountain View, CA (US); Joel Sercel, Lake View Terrace, CA (US); Mikhail Kokorich, Los Altos Hills, CA (US); James Small, Sonoita, AZ (US); Nicholas Simon, San Jose, CA (US); Nathan Orr, San Jose, CA (US); Samuel Avery, San Jose, CA (US); Scott Stanley, Northridge, CA (US)

(73) Assignee: MOMENTUS SPACE LLC, San Jose, CA (US)

( * ) Notice: Subject to any disclaimer, the term of this patent is extended or adjusted under 35 U.S.C. 154(b) by 0 days.

(21) Appl. No.: 17/735,357

(22) Filed: May 3, 2022

(65) Prior Publication Data

US 2022/0258885 A1 Aug. 18, 2022

Related U.S. Application Data

(63) Continuation of application No. 16/773,920, filed on Jan. 27, 2020, now Pat. No. 11,352,150.

(60) Provisional application No. 62/956,153, filed on Dec. 31, 2019, provisional application No. 62/817,047, filed on Mar. 12, 2019.

(51) Int. Cl.
*B64G 1/40* (2006.01)
*B64G 1/24* (2006.01)
*B64G 1/54* (2006.01)
*B64G 1/64* (2006.01)

(52) U.S. Cl.
CPC ............... *B64G 1/402* (2013.01); *B64G 1/24* (2013.01); *B64G 1/244* (2019.05); *B64G 1/546* (2013.01); *B64G 1/641* (2013.01); *B64G 1/401* (2013.01)

(58) Field of Classification Search
CPC .......... B64G 1/24; B64G 1/244; B64G 1/401; B64G 1/402; B64G 1/546; B64G 1/641
USPC ....................................................... 244/172.2
See application file for complete search history.

(56) References Cited

U.S. PATENT DOCUMENTS

| | | | |
|---|---|---|---|
| 3,180,084 A | 4/1965 | Meeks | |
| 3,316,718 A | 5/1967 | Webb | |
| 3,595,022 A | 7/1971 | Radebold et al. | |
| 5,058,834 A * | 10/1991 | Hubert | B64G 1/244 244/164 |
| 5,099,645 A | 3/1992 | Schuler et al. | |

(Continued)

FOREIGN PATENT DOCUMENTS

| | | |
|---|---|---|
| FR | 2 991 300 A1 | 12/2013 |
| NL | 2 018 679 B1 | 10/2018 |

OTHER PUBLICATIONS

International Search Report and Written Opinion for Application No. PCT/US2020/022472, dated Jul. 10, 2020.

*Primary Examiner* — Brady W Frazier
(74) *Attorney, Agent, or Firm* — MARSHALL, GERSTEIN & BORUN LLP

(57) ABSTRACT

In a method of facilitating flight operations, a payload is coupled to a spacecraft via a payload interface. The relative alignment of the payload and the spacecraft is dynamically adjusted (e.g., for thrust alignment) while the payload remains coupled to the spacecraft.

18 Claims, 6 Drawing Sheets

(56) References Cited

U.S. PATENT DOCUMENTS

| | | | | |
|---|---|---|---|---|
| 5,214,361 | A * | 5/1993 | Labruyere | H01Q 3/02 |
| | | | | 318/560 |
| 5,529,264 | A | 6/1996 | Bedegrew et al. | |
| 5,597,141 | A * | 1/1997 | Storaasli | B64G 1/22 |
| | | | | 244/164 |
| 5,823,478 | A | 10/1998 | Dunn | |
| 5,850,989 | A | 12/1998 | Trudeau et al. | |
| 6,101,808 | A | 8/2000 | Knuth et al. | |
| 6,113,035 | A * | 9/2000 | Hubert | B64G 1/288 |
| | | | | 701/13 |
| 6,609,363 | B1 | 8/2003 | Dressler et al. | |
| 7,022,196 | B2 | 4/2006 | Cesaroni et al. | |
| 10,598,128 | B1 | 3/2020 | Carlson et al. | |
| 2003/0136881 | A1* | 7/2003 | Beyer | B64G 1/641 |
| | | | | 244/158.1 |
| 2004/0262440 | A1* | 12/2004 | Ziavras | B64G 1/24 |
| | | | | 242/371 |
| 2017/0036782 | A1 | 2/2017 | Dula | |
| 2017/0363044 | A1 | 12/2017 | Rhodes | |
| 2021/0387753 | A1* | 12/2021 | D'Souza | B64G 1/401 |

* cited by examiner

DYNAMICALLY ADJUSTED ALIGNMENT BETWEEN PAYLOAD AND SPACECRAFT

CROSS-REFERENCE TO RELATED APPLICATIONS

This is a continuation of U.S. patent application Ser. No. 16/773,920, filed on Jan. 27, 2020 and titled "Spacecraft Structures Configured to Store Frozen Propellant," which claims the benefit of U.S. Provisional Patent Application No. 62/817,047, filed on Mar. 12, 2019 and titled "Method and System for Aligning Coupled Spacecraft to a Common Thrust Vector" and U.S. Provisional Patent Application No. 62/956,153, filed on Dec. 31, 2019 and titled "Spacecraft Structures and Mechanisms." The disclosure of each of the above-identified applications is incorporated herein by reference in its entirety for all purposes.

FIELD OF THE DISCLOSURE

The disclosure generally relates to operating a spacecraft and more specifically to structures and mechanisms, particularly for storing propellant.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With increased commercial and government activity in the near space, a variety of spacecraft and missions are under development. Multiple propulsion techniques are known, and today the spacecraft can implement several types of thrusters.

One such type is microwave electrothermal thruster (METs), based on a method of electrical propulsion that uses a microwave power source to generate and heat a plasma contained within a resonant chamber or resonant cavity. Generally speaking, the microwave energy is provided to the chamber by means of a probe (sometimes referred to as an "antenna") or a waveguide. This microwave energy raises the temperature of a gaseous propellant and provides thrust in the form of hot gases exiting the chamber through a nozzle.

Efficiently storing and transporting propellant for the thrusters remains a challenge in the industry.

SUMMARY

Generally speaking, the techniques of this disclosure allow efficient transportation of propellant to space as well between different orbits in space. Further, these techniques improve the strength of the structure of a spacecraft, to better protect the spacecraft from damage caused by vibration during a launch procedure. Still further, these techniques allow the spacecraft to couple to payloads in a reliable manner. Moreover, these techniques improve the protection of the electronic components of the spacecraft or of the payload from radiation.

One example embodiment of these techniques is a method of facilitating flight operations. The method includes coupling a payload to a spacecraft via a payload interface, and dynamically adjusting the relative alignment of the payload and the spacecraft while the payload remains coupled to the spacecraft.

Another example embodiment of these techniques is a method in a spacecraft for transporting propellant to be consumed by a thruster. The method includes storing the propellant in the spacecraft in a solid state during at least a portion of a take-off procedure and supplying the propellant to the thruster in a liquid or vaporous state when the spacecraft is in space.

Another example embodiment of these techniques is an adapter for connecting a spacecraft to a payload. The adapter includes multiple fastening elements, each actuated to release a connection between the spacecraft and the payload; and an actuator configured to simultaneously actuate each of the plurality of fastening elements to release the payload from the spacecraft.

Another example embodiment of these techniques is a method in a spacecraft for transporting propellant to be consumed by a thruster. The method includes storing at least a portion of the propellant within a hollow component that provides structural support to the spacecraft, to thereby increase volumetric efficiency of the spacecraft; and supplying the propellant to the thruster.

Another example embodiment of these techniques is a spacecraft including a thruster; a propellant tank configured to store a portion of a propellant for consumption by the thruster; and a supporting structure of the spacecraft, the supporting structure including a hollow element fluidicly coupled to the propellant tank, the hollow element configured to store a second portion of the propellant for consumption by the thruster.

Another example embodiment of these techniques is a spacecraft a thruster and a propellant tank configured to store propellant for consumption by the thruster, the tank disposed so as to shield one or more electronic components from radiation.

Another example embodiment of these techniques is a spacecraft including a thruster configured to consume propellant to generate thrust; a supporting structure configured to provide structural support to the spacecraft, the structure including one or more beams; and a component configured to store at least a portion of the propellant, the component rigidly coupled to the one or more beams of the supporting structure so that, when the at least a portion of the propellant is in a solid state within the component, the component exerts a force upon the one or more beams to increase a structural strength of the spacecraft.

Another example embodiment of these techniques is a spacecraft including a thruster; an expandable propellant tank configured to store propellant for consumption by the thruster; and a biasing element configured to bias the expendable tank toward a compressed state.

Another example embodiment of these techniques is a spacecraft including a thruster; a propellant tank configured to store propellant for consumption by the thruster; and a compressible element disposed in the propellant tank, the compressible element configured to decrease in volume in response to pressure exerted by the propellant changing from a liquid state to a solid state.

DETAILED DESCRIPTION

In the inner solar system, continuous electric power is available through solar cell collectors installed on spacecraft. The ample and reliable availability of electric power in space enables many new commercial applications which would not be economical if launched from earth. Among these are in-space services delivered directly to previously launched satellites. These include refueling services and orbital transfer vehicles (aka space tugs) which can provide post-launch orbital change for a variety of commercial customers.

The spacecraft of this disclosure may be configured for transferring a payload from a lower energy orbit to a higher energy orbit according to a set of mission parameters. The mission parameters may include, for example, a time to complete the transfer and an amount of propellant and/or fuel available for the mission. Generally, spacecraft may collect solar energy and use the energy to power one or more thrusters. Different thruster types and/or operating modes may trade off the total amount of thrust with the efficiency of thrust with respect to fuel or propellant consumption, defined as a specific impulse.

A proposed spacecraft that includes thrusters of different types may improve the efficiency of using solar energy for increasing orbital energy. Reusing spacecraft subsystems for operating the different-type thrusters may reduce the mass and/or complexity of the spacecraft, decreasing mission time while maintaining and/or improving reliability. Additionally or alternatively, the spacecraft configured to choose or alternate between thrusters of different types as primary thrusters, may be optimized for various mission goals (e.g., different payloads, different destination orbits) and/or mission constraints (e.g., propellant availability). The optimization may include variations in collecting and storing solar energy as well as in controlling when the different thrusters use the energy and/or propellant, as discussed below.

Figure 1:
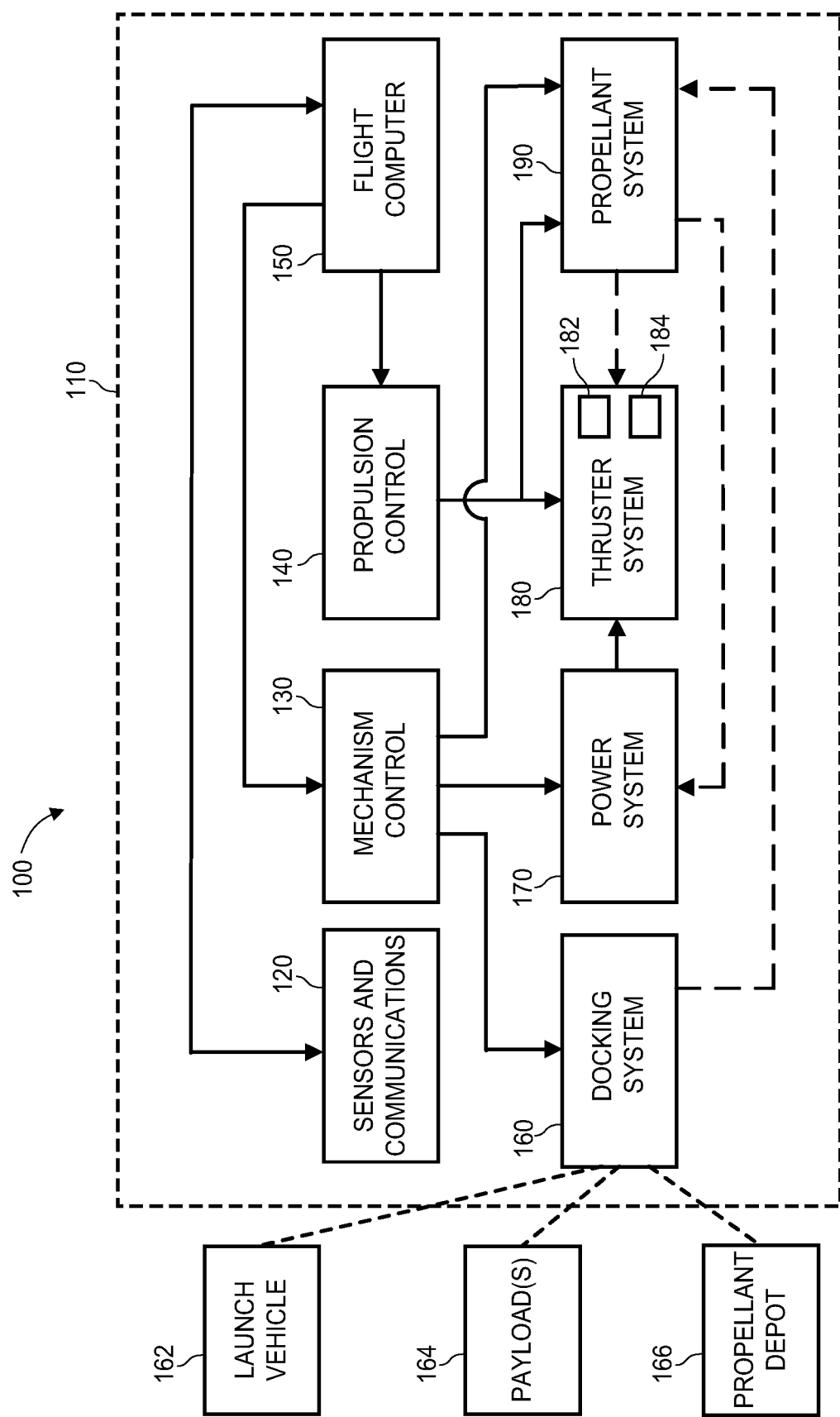
FIG. 1 is a block diagram of an example spacecraft in which the techniques of this disclosure can be implemented.

FIG. 1 is a block diagram of a spacecraft 100 configured for transferring a payload between orbits. The spacecraft 100 includes a number of subsystems, units, or components disposed in or at a housing 110. The subsystems of the spacecraft 100 may include sensors and communications components 120, mechanism control 130, propulsion control 140, a flight computer 150, a docking system 160 (for attaching to a launch vehicle 162, one or more payloads 164, a propellant depot 166, etc.), a power system 170, a thruster system 180 that includes a first thruster 182 and a second thruster 184, and a propellant system 190. Furthermore, any combination of subsystems, units, or components of the spacecraft 100 involved in determining, generating, and/or supporting spacecraft propulsion (e.g., the mechanism control 130, the propulsion control 140, the flight computer 150, the power system 170, the thruster system 180, and the propellant system 190) may be collectively referred to as a propulsion system of the spacecraft 100.

The sensors and communications components 120 may include a number of sensors and/or sensor systems for navigation (e.g., imaging sensors, magnetometers, inertial motion units (IMUs), Global Positioning System (GPS) receivers, etc.), temperature, pressure, strain, radiation, and other environmental sensors, as well as radio and/or optical communication devices to communicate, for example, with a ground station, and/or other spacecraft. The sensors and communications components 120 may be communicatively connected with the flight computer 150, for example, to provide the flight computer 150 with signals indicative of information about spacecraft position and/or commands received from a ground station.

The flight computer 150 may include one or more processors, a memory unit, computer readable media, to process signals received from the sensors and communications components 120 and determine appropriate actions according to instructions loaded into the memory unit (e.g., from the computer readable media). Generally, the flight computer 150 may be implemented any suitable combination of processing hardware, that may include, for example, applications specific integrated circuits (ASICS) or field programmable gate arrays (FPGAs), and/or software components. The flight computer 150 may generate control messages based on the determined actions and communicate the control messages to the mechanism control 130 and/or the propulsion control 140. For example, upon receiving signals indicative of a position of the spacecraft 100, the flight computer 150 may generate a control message to activate one of the thrusters 182, 184 in the thruster system 180 and send the message to the propulsion control 140. The flight computer 150 may also generate messages to activate and direct sensors and communications components 120.

The docking system 160 may include a number of structures and mechanisms to attach the spacecraft 100 to a launch vehicle 162, one or more payloads 164, and/or a propellant refueling depot 166. The docking system 160 may be fluidically connected to the propellant system 190 to enable refilling the propellant from the propellant depot 166. Additionally or alternatively, in some implementations at least a portion of the propellant may be disposed on the launch vehicle 162 and outside of the spacecraft 100 during launch. The fluidic connection between the docking system 160 and the propellant system 190 may enable transferring the propellant from the launch vehicle 162 to the spacecraft 100 upon delivering and prior to deploying the spacecraft 100 in orbit.

The power system 170 may include components (discussed in the context of FIGS. 4-7) for collecting solar energy, generating electricity and/or heat, storing electricity and/or heat, and delivering electricity and/or heat to the thruster system 180. To collect solar energy into the power system 170, solar panels with photovoltaic cells, solar collectors or concentrators with mirrors and/or lenses, or a suitable combination of devices may collect solar energy. In the case of using photovoltaic devices, the power system 170 may convert the solar energy into electricity and store it in energy storage devices (e.g, lithium ion batteries, fuel cells, etc.) for later delivery to the thruster system 180 and other spacecraft components. In some implementations, the power system 180 may deliver at least a portion of the generated electricity directly to the thruster system 180 and/or to other spacecraft components. When using a solar concentrator, the power system 170 may direct the concentrated (having increased irradiance) solar radiation to photovoltaic solar cells to convert to electricity. In other implementations, the power system 170 may direct the concentrated solar energy to a solar thermal receiver or simply, a thermal receiver, that may absorb the solar radiation to generate heat. The power system 170 may use the generated heat to power a thruster directly, as discussed in more detail below, to generate electricity using, for example, a turbine or another suitable technique (e.g., a Stirling engine).

The thruster system 180 may include a number of thrusters and other components configured to generate propulsion or thrust for the spacecraft 100. Even though FIG. 1 illustrates the thruster system 180 with two thrusters 182, 184, the thruster system may generally have more or less than two (i.e., one) thrusters to generate propulsion. Thrusters may generally include main thrusters that are configured to substantially change speed of the spacecraft 100, or as attitude control thrusters that are configured to change direction or orientation of the spacecraft 100 without substantial changes in speed. In some implementations, the first thruster 182 and the second thruster 184 may both be configured as main thrusters, with additional thrusters configured for attitude control. The first thruster 182 may operate according to a first propulsion technique, while the second thruster 184 may operate according to a second propulsion technique.

The first thruster 182 may be a microwave-electro-thermal (MET) thruster. In a MET thruster cavity, an injected amount of propellant may absorb energy from a microwave source (that may include one or more oscillators) included in the thruster system 180 and, upon partial ionization, further heat up, expand, and exit the MET thruster cavity through a nozzle, generating thrust.

The second thruster 184 may be a solar thermal thruster. In one implementation, propellant in a thruster cavity acts as the solar thermal receiver and, upon absorbing concentrated solar energy, heats up, expands, and exits the nozzle generating thrust. In other implementations, the propellant may absorb heat before entering the cavity either as a part of the thermal target or in a heat exchange with the thermal target or another suitable thermal mass thermally connected to the thermal target. In some implementations, while the propellant may absorb heat before entering the thruster cavity, the thruster system 180 may add more heat to the propellant within the cavity using an electrical heater or directing a portion of solar radiation energy to the cavity.

The propellant system 190 may store the propellant for use in the thruster system 180. The propellant may include water, hydrogen peroxide, hydrazine, ammonia or another suitable substance. The propellant may be stored on the spacecraft in solid, liquid, and/or gas phase. To that end, the propellant system 190 may include one or more tanks. To move the propellant within the spacecraft 100, and to deliver the propellant to one of the thrusters, the propellant system may include one or more pumps, valves, and pipes. As described below, the propellant may also store heat and/or facilitate generating electricity from heat, and the propellant system 190 may be configured, accordingly, to supply propellant to the power system 170.

The mechanism control 130 may activate and control mechanisms in the docking system 160 (e.g., for attaching and detaching payload or connecting with an external propellant source), the power system 170 (e.g., for deploying and aligning solar panels or solar concentrators), and/or the propellant system (e.g., for changing configuration of one or more deployable propellant tanks). Furthermore, the mechanism control 130 may coordinate interaction between subsystems, for example, by deploying a tank in the propellant system 190 to receive propellant from an external source connected to the docking system 160.

The propulsion control 140 may coordinate the interaction between the thruster system 140 and the propellant system 190, for example, by activating and controlling electrical components (e.g., a microwave source) of the thruster system 140 and the flow of propellant supplied to thrusters by the propellant system 190. Additionally or alternatively, the propulsion control 140 may direct the propellant through elements of the power system 170. For example, the propellant system 190 may direct the propellant to absorb the heat (e.g., at a heat exchanger) accumulated within the power system 170. Vaporized propellant may then drive a power plant (e.g., a turbine, a Stirling engine, etc.) of the power system 170 to generate electricity. Additionally or alternatively, the propellant system 190 may direct some of the propellant to charge a fuel cell within the power system 190.

The subsystems of the spacecraft may be merged or subdivided in different implementations. For example, a single control unit may control mechanisms and propulsion. Alternatively, dedicated controllers may be used for different mechanisms (e.g., a pivot system for a solar concentrator), thrusters (e.g., a MET thruster), valves, etc. In the following discussion, a controller may refer to any portion or combination of the mechanism control 130 and/or propulsion control 140.

Figure 2:
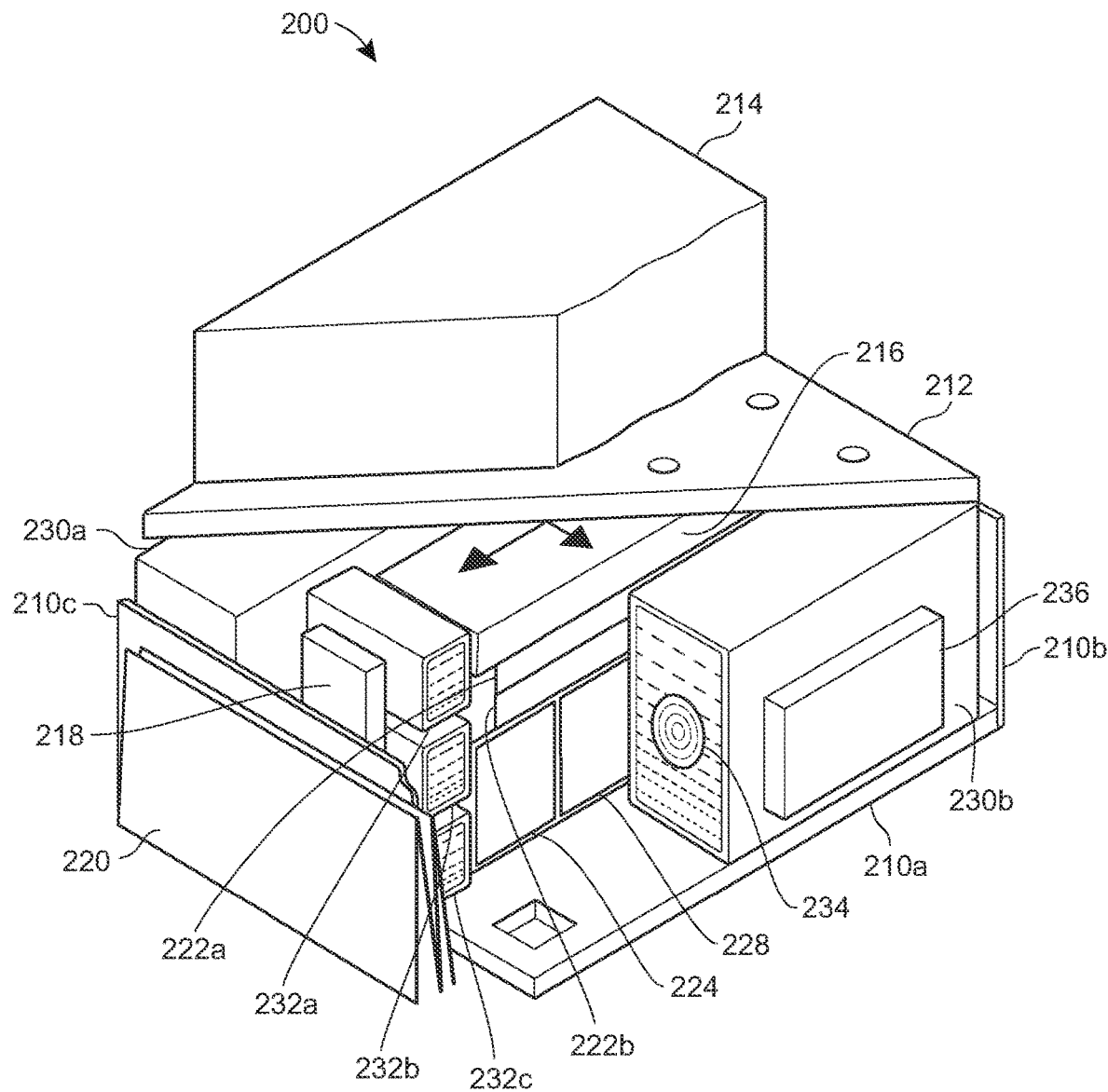
FIG. 2 is a cutaway view of an example spacecraft in which some of the techniques of this disclosure can be implemented.

FIG. 2 illustrates a spacecraft configuration 200 that includes housing walls 210a-c, a payload interface 212, a payload 214, a mechanism for payload alignment 216, mechanisms for solar panel deployment 218 (only one side is shown due to perspective), solar panels 220, electronics bays 222a,b, a power system bay 224, a thruster bay 228, dedicated propellant tanks 230a,b, and hollow structural supports 232a-c. The electronics bays 222a,b may house at least some of the sensors and communications components 120, the mechanism control 130, the propulsion control 140, and/or the flight computer 150. The power system bay 224 may house at least some of the components of the power system 170 (e.g., a battery, a fuel cell, power conversion devices, a power conditioning unit, etc.). The thruster bay 228 may house one or more thrusters (e.g., thrusters 182, 184) included in the thruster system 180.

The dedicated propellant tanks 230a,b may be configured to store at least a portion of the propellant in gas, liquid, and/or solid state. The propellant tanks 230a,b may include collapsible elements 234, e.g., elastic balls (only one side is shown due to perspective), that change volume in response to external pressure, as described in the context of FIG. 6A-D. Further, the propellant tanks 230a,b may include expandable compartments 236 (only one side is shown due to perspective). The propellant tanks 230a,b may be fluidicly connected to one or pumps for supplying the propellant in a liquid or vaporous state to the one or more thrusters in the thruster system 180.

The propellant, disposed in any hollow component of the spacecraft may shield one or more electronic components from space radiation sources. The hollow components (e.g., the structural supports 232a-c) may be disposed relative to electronic components, so as to shield the electronic components. For example, the hollow components with propellant may substantially surround the shielded electronic components from radiation. Furthermore, the propellant system 190 may be configured to maintain the liquid propellant in the hollow elements configured for shielding, while directing the propellant from other tanks or elements to the thruster system 180.

Figure 3:
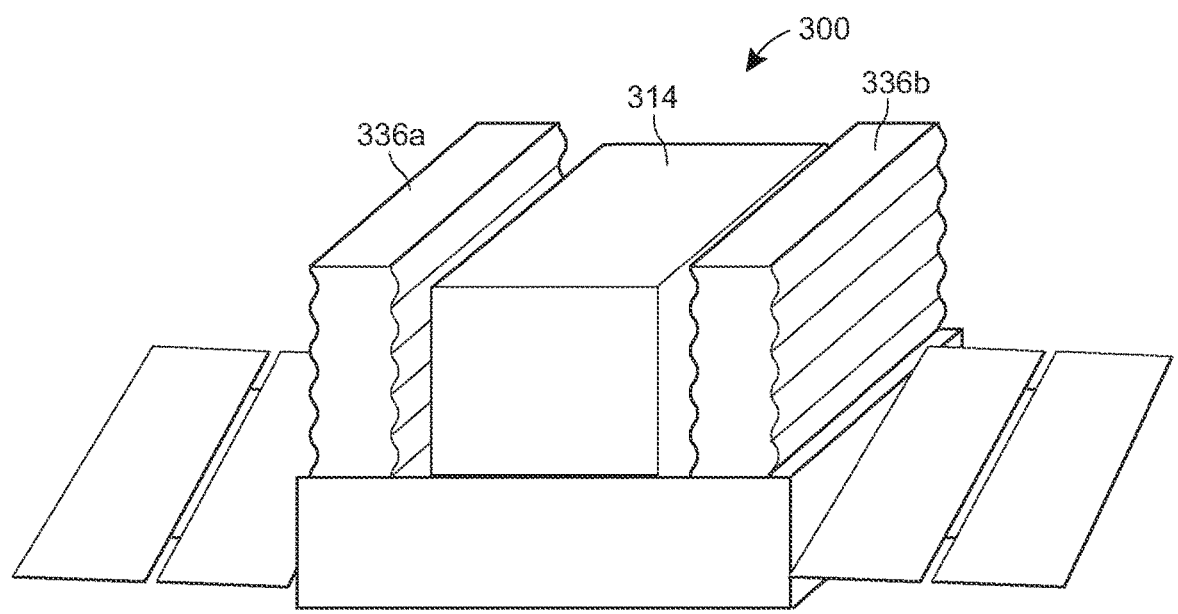
FIG. 3 illustrates is a spacecraft configuration with deployed expandable tanks with liquid propellant that shield the payload from radiation.

FIG. 3 illustrates a spacecraft configuration 300 with deployed expandable tanks 236a,b configured to hold liquid propellant to shield the payload 314 from radiation.

Figure 4:
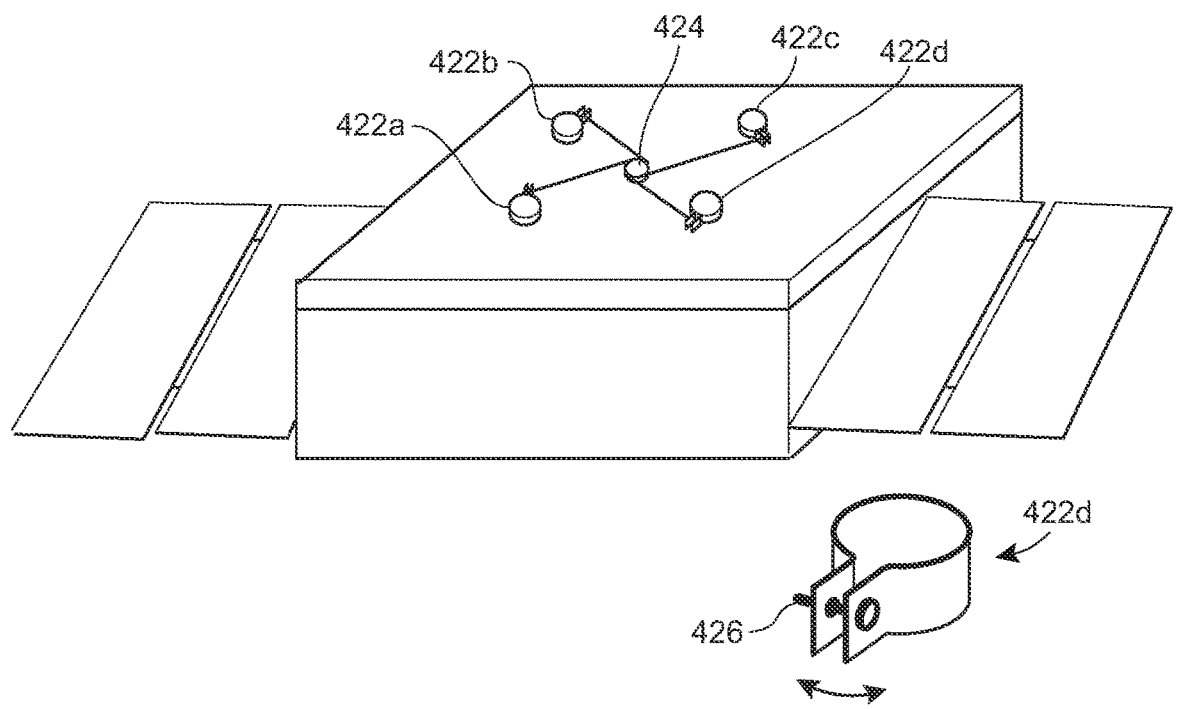
FIG. 4 illustrates a spacecraft configuration in which the spacecraft adapter includes a multiple fastening elements with a common actuator.

FIG. 4 illustrates a spacecraft configuration in which the spacecraft adapter 212 includes a plurality of fastening elements, each actuated to release a connection between the spacecraft and a payload. An actuator (e.g., a servo motor, a released spring, etc.) may be configured to simultaneously actuate each of the fastening elements to release the payload from the spacecraft. To that end, the actuator may be connected to each of the fastening elements with a corresponding cable. Furthermore, each fastening element may be elastic or otherwise configured (e.g., by an addition of a spring mechanism) to have a restorative force acting in the direction opposing the tension of the corresponding cable, keeping the cables under tension.

The fastening elements may be radially disposed around the actuator. In some implementations, the fastening elements may be substantially equidistant from the actuator. For example, 3, 4, 5, 6 or any suitable number of fastening elements disposed with equal separation along a circle centered at the actuator. As described above, each fastening element may be connected to the actuator via a respective cable. The rotational movement of the actuator may cause the cables to actuate the respective fastening elements and release the payload. The actuator may itself include a spring element and the adapter may include a pyrotechnic element that, when activated, may cause the adapter to release the payload, fore example by releasing the tension on the cables.

Figure 5:
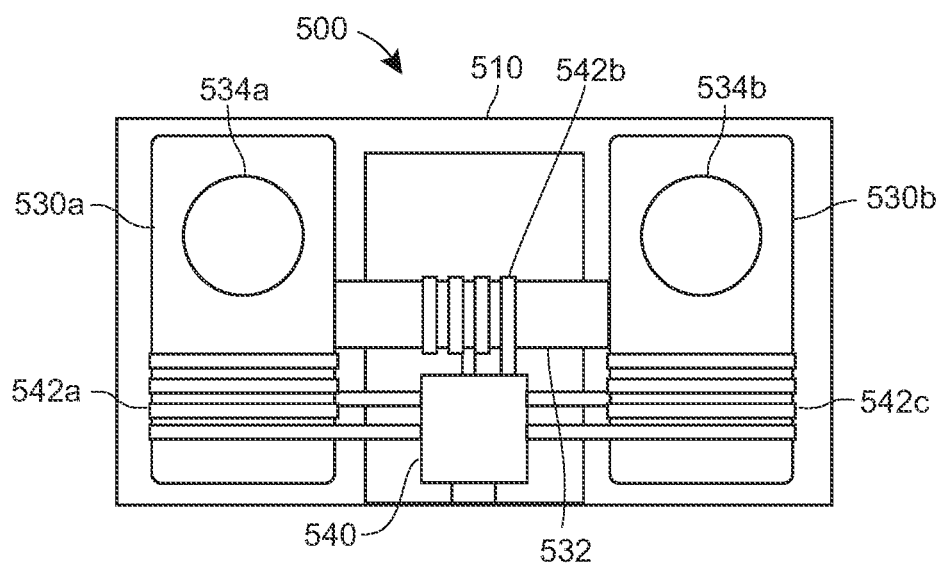
FIG. 5 illustrates a cross-section of a spacecraft that stores propellant in a solid state during at least a portion of a take-off procedure.

FIG. 5 illustrates a cross-section of a spacecraft 500 (e.g., the spacecraft 200) configured for storing propellant in a solid state during at least a portion of a take-off procedure. The spacecraft 500 may include, within a housing 510, a number of enclosed volumes for storing the propellant. The spacecraft 500 may store the propellant in dedicated tanks 530a,b or in structural elements, such as a beam 532. The beam 532, along with other structural elements may provide structural strength to spacecraft 500. Even though the primary purpose of the tanks 530a,b is to store propellant, in some implementations, the tanks 530a,b may also provide structural strength to the spacecraft 500. Storing at least a portion of the propellant in the solid state within the beam 532 and/or another suitable hollow component that provides structural support to the spacecraft, may increase stiffness and/or structural strength of the spacecraft during the take-off procedure. The suitable hollow components may include a portion of an outer housing 510, for example.

In some implementations, storing propellant in the solid state includes freezing the propellant using a refrigeration system 540 disposed at least in part within the spacecraft 500. In some implementations, the refrigeration system 540 may be disposed outside of the spacecraft and configured to freeze propellant prior to launch (e.g., prior to initiating the take-off procedure). The refrigeration system 540 may be connected to heat exchange coils 542a-c. The refrigeration system 540 and the coils 542a-c may be configured to freeze a portion of the propellant in the beam 532 prior to freezing the propellant in the tanks 534a,b. Generally, the refrigeration system 540 may be configured to freeze propellant in a hollow element with a smaller cross-section prior to freezing propellant in a hollow element with larger cross-section. Thus, freezing sequence may be configured to mitigate the risk of damaging vulnerable propellant system elements. Furthermore, larger hollow components for holding propellant may include collapsible elements configured to reduce forces exerted on propellant system components by the frozen propellant.

Figures 6A, 6B, 6C, 6D:
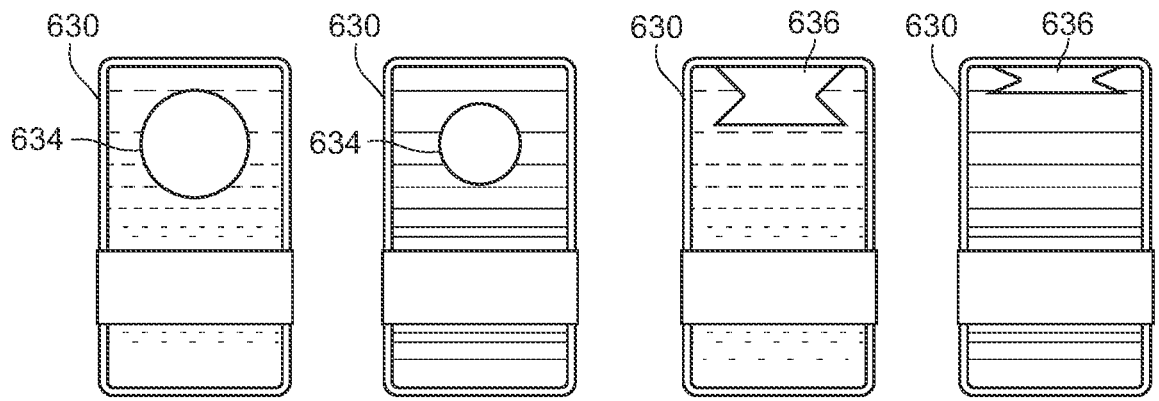
FIGS. 6A-D illustrate an example tank with a collapsible element.

FIGS. 6A-D illustrate an example tank 630 including a collapsible element 634 in FIGS. 6A,B or a collapsible element 636 in FIGS. 6C,D. In FIG. 6A, the propellant (e.g., water) in the tank 630 is in a liquid state. The compressible element 634 may be an elastic ball. When the propellant is frozen, as illustrated in FIG. 6B, the compressible elements is compressed under the force of the frozen propellant, increasing available tank volume for the frozen propellant. The compressible element 636 has an accordion shape and includes an elastic element (e.g., a spring, enclosed gas under pressure, restorative force of the accordion structure, etc.). Like the compressible element 634, the compressible element 636 compresses under the force of the freezing propellant to increase the volume in the tank 634 for the frozen propellant.

Figure 7A:
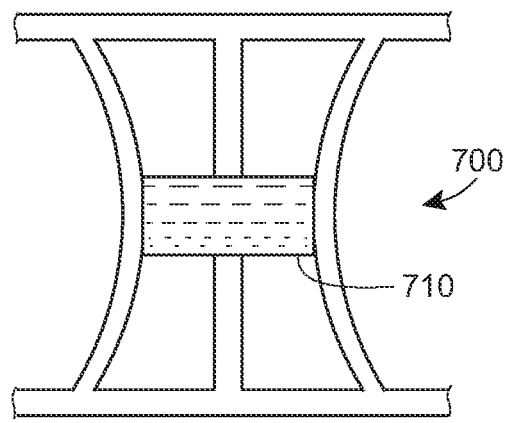
FIGS. 7A and 7B illustrate a supporting structure with one or more beams that may rigidly couple to a component configured to store propellant.
Figure 7B:
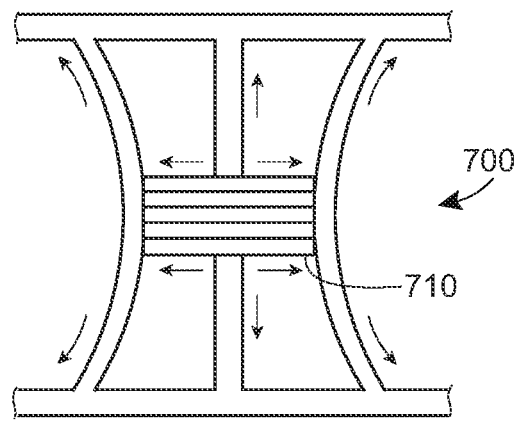

FIGS. 7A,B illustrate a supporting structure 700 (of a spacecraft) with one or more beams that may rigidly couple to a component 710 configured to store propellant for the spacecraft. Freezing the propellant in the component and thereby causing the propellant's expansion may exert forces of the one or more beams, increasing the structural strength of the support structure, and, therefore, the spacecraft. In some implementations, the component 710 may be a hollow beam of the support structure. In other implementations, the component 710 is a propellant tank or a portion of the propellant tank.

Figure 8A:
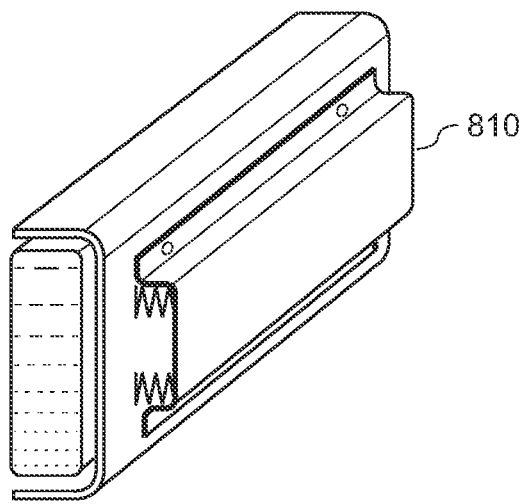
FIGS. 8A and 8B illustrate an example collapsible tank that can be used in the spacecraft of this disclosure.
Figure 8B:
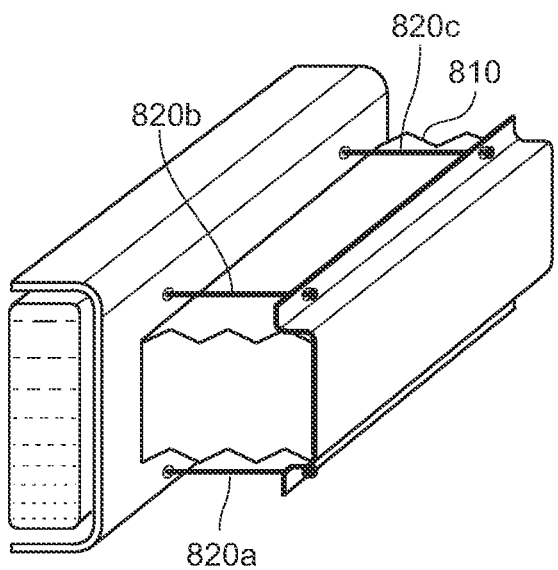

FIGS. 8A,B illustrate, correspondingly, a collapsed and an expanded configuration of an expandable propellant tank 810 that has an accordion structure. The tank 810 may be mounted on the exterior of the spacecraft. The propellant tank 810 may remain collapsed during take-off. The tank 810 may expand to accommodate propellant in liquid and/or vapor form. For example, the propellant tank may increase in volume when filled with heated propellant vapor. The tank 810 may be configured to be substantially insulated to preserve the enthalpy of the propellant stored within it. In other implementations, the tank 810 is configured to radiate energy and conduct heat away from the propellant. In some embodiments, the tank 810 may include one or more biasing elements (e.g., cables, springs, etc.) that apply a force opposite to the expansion directions of the tank 810. In some implementations, the biasing elements may maintain a substantially constant pressure of the fluid mixture within the tank 810.

Figure 9A:
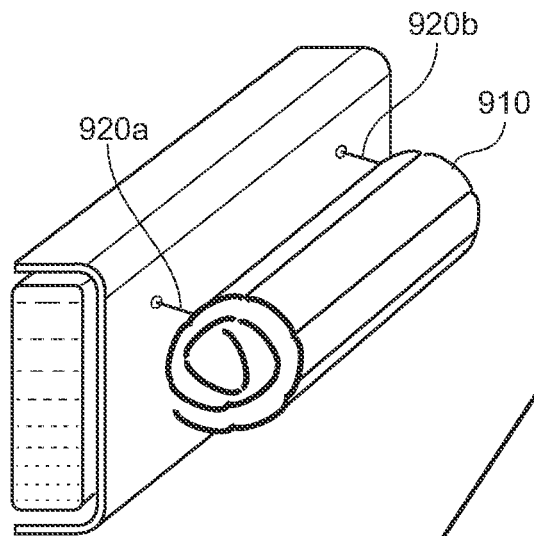
FIGS. 9A and 9B illustrate another example collapsible tank that can be used in the spacecraft of this disclosure.
Figure 9B:
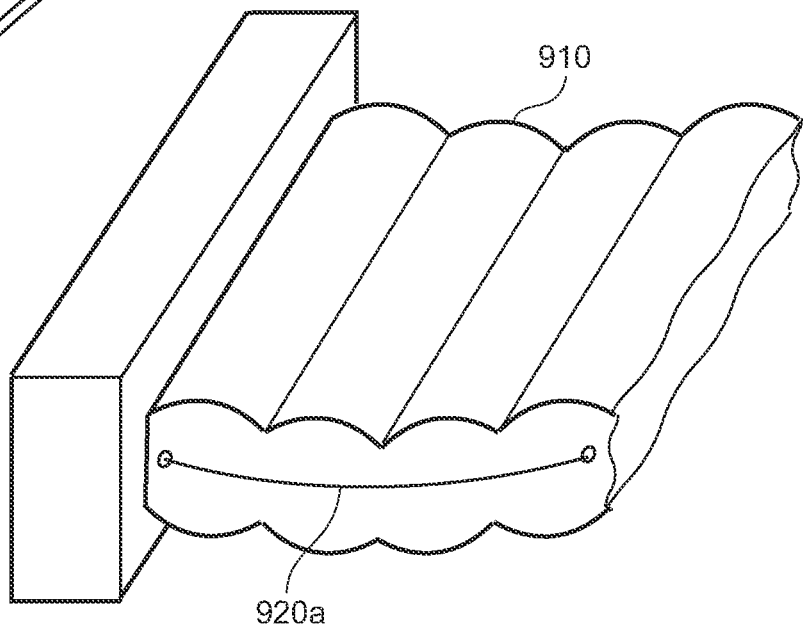

FIGS. 9A,B illustrate, correspondingly, a collapsed and an expanded configuration of an expandable propellant tank 910. The propellant tank 910 may function substantially similarly to the propellant tank 810, but have a substantially distinct deployment structure. The tank 810 may have built-in tension.

Next, a method and system are described for changing the relative positions a first spacecraft which is temporarily connected to a second spacecraft during space flight with reference to FIGS. 1 and 2. While connected, the relative positions of the first and second spacecraft may be dynamically adjusted. Thus, the thrust vector may be dynamically adjusted with respect to the center of mass of the attached first spacecraft for the purpose of directional steering.

It may be advantageous to develop a family of standardized multipurpose space service vehicles. A space service vehicle design may include an adjustable payload interface in order to accommodate a wide range of coupled or captured commercial space products. In general, the service vehicle may provide thrust and maneuver propulsion to client satellite systems. The service vehicle must accommodate a range of mass and mass-distribution configurations in client systems, including the configurations described in this disclosure.

When providing propulsion services to a client system, it may be advantageous to thrust directly through the center of mass of the coupled system in order to avoid imparting unwanted spin. The discussion here describes a capture interface (that can be standardized) between the service vehicle and the client system. The interface further allows the captured client payload to be dynamically moved relative to the service vehicle during space flight to allow thrust from the service vehicle to be aligned with the client center of mass.

The space service vehicle may contain inertial navigation instruments to measure the roll, pitch, and yaw of the coupled system. A control system within the service vehicle may dynamically adjusts the attachment interface to correct for undesired pitch and yaw motions during thrusting events. In this manner, the service vehicle can compensate for mass changes and mass distribution changes in both the service vehicle and the client system that may occur during flight operations. For example, such changes may arise due to consumption of propellants or due to mechanical motions of optical sensors and antenna pointing systems.

When moving a client space system from one orbit to another during orbit change maneuvers, it may be advantageous to change the heading and thrust direction of the coupled system. Momentum gyros or a multiplicity of small thrusters may provide torque in order to change the pitch and yaw headings of a spacecraft before or during thrusting operations. The adjustable attachment interface described here, also can provide intentional pitch and yaw forces to the coupled system without the need to engage momentum gyros or additional small thrusters, thereby reducing the number of components and systems required for orientation control and simplifying the design of service vehicles that may be standardized. The control system within the service vehicle may controllably offset the thrust vector from the center of mass to dynamically adjust pitch and yaw rate and to produce desired final direction headings during thrusting events.

Figure 10:
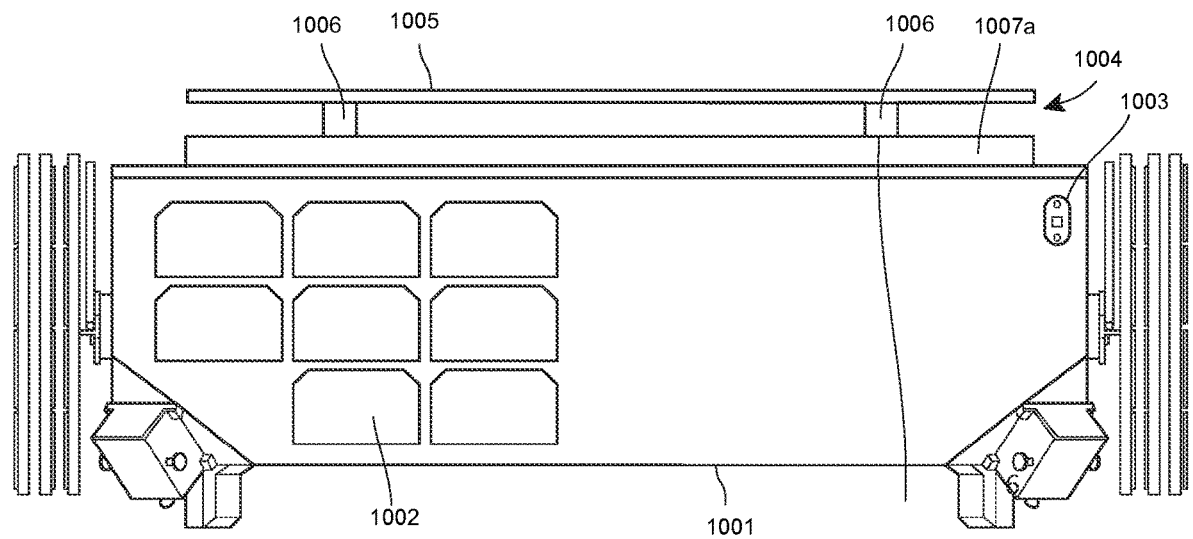
FIG. 10 illustrates a simplified end view of an example space service vehicle configured to interface with a payload.
Figure 11:
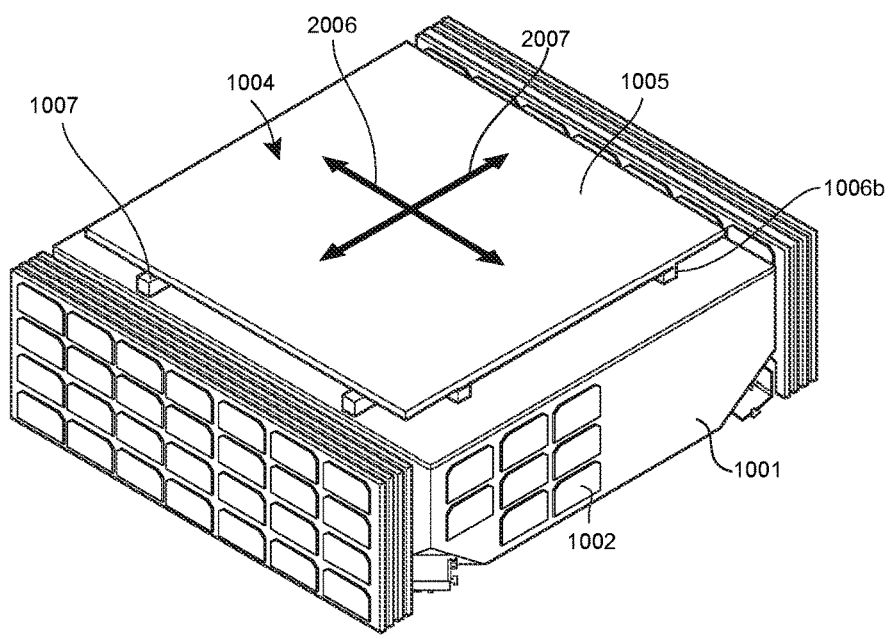
FIG. 11 is a perspective view of the space service vehicle in FIG. 10.

FIG. 10 illustrates a simplified end view of an example space service vehicle 1001. FIG. 11 depicts a simplified perspective view of the space service vehicle 1001.

The vehicle 1001 may be equipped with solar cells 1002 and various sensors (e.g., sensor 1003). The depicted upper surface of the service vehicle 1001 may include a payload attachment interface 1004. The interface 1004 may include of an upper payload mounting plate 1005 to which a client payload can be attached. Mounting plate 1005 is further attached to a first dual rail system 1006 which is in turn attached to a second dual rail system 1007. The first dual rail system 1006 may be actuated by an electric motor and a track or lead-screw mechanism (not shown) causing the plate 1005 to move back or forth in a longitudinal direction along the length of the rail system 1006, as indicated by the arrow 2006 in FIG. 11. Similarly, the rail system 1007 may be actuated by a second electric motor and track system (also not shown) for the purpose of moving the first dual rail system 1006 and the mounting plate 1005 in a lateral direction along the length of rail system 1007, as indicated by the arrow 2007 in FIG. 11. In this manner, any client payload attached to mounting plate 1005 may be moved in both longitudinal and lateral directions, for example, until its center of mass aligns with the thrust provided by the space service vehicle 1001.

The following list of aspects reflects a variety of the embodiments explicitly contemplated by the present disclosure.

Aspect 1. A method in a spacecraft for transporting propellant to be consumed by a thruster includes storing the propellant in the spacecraft in a solid state during at least a portion of a take-off procedure; and supplying the propellant to the thruster in a liquid or vaporous state when the spacecraft is in space.

Aspect 2. The method of aspect 1, further comprising storing at least a portion of the propellant in a dedicated propellant tank.

Aspect 3. The method of aspect 2, wherein the dedicated propellant tank includes a collapsible element, wherein a volume of the collapsible element decreases as the propellant freezes in the propellant tank.

Aspect 4. The method of any of aspects 1-3, further comprising storing at least a portion of the propellant in the solid state within a hollow component that provides structural support to the spacecraft, to thereby increase stiffness of the spacecraft during the take-off procedure.

Aspect 5. The method of aspect 4, wherein the hollow component is a portion of an outer housing of the spacecraft.

Aspect 6. The method of aspect 4, wherein the hollow component is disposed relative to one or more electric components of the spacecraft so as to shield the one or more electronic components from radiation.

Aspect 7. The method of aspect 6, wherein the hollow component substantially surrounds the one or more electronic components.

Aspect 8. The method of any of aspects 1-7, further comprising freezing the propellant using a refrigeration system external to the spacecraft, prior to initiating the take-off procedure.

Aspect 9. The method of any of aspects 1-7, further comprising freezing the propellant using a refrigeration system operating in the spacecraft.

Aspect 10. The method of aspect 1, further comprising: freezing a first portion of the propellant in a first storage component having a first cross-section; subsequently to freezing the first portion of the propellant, freezing a second portion of the propellant in a second storage component having a second cross-section and fluidly coupled to the first storage component, wherein the first cross-section is smaller than the second cross-section.

Aspect 11. The method of aspect 1, wherein the propellant is one of (i) water, (ii) hydrozene, (iii) hydrogen peroxide, or (iii) ammonia.

Aspect 12. An adapter for connecting a spacecraft to a payload, the adapter comprising: a plurality of fastening elements, each actuated to release a connection between the spacecraft and the payload; and an actuator configured to simultaneously actuate each of the plurality of fastening elements to release the payload from the spacecraft.

Aspect 13. The adapter of aspect 12, wherein the plurality of fastening elements consists of four fastening elements radially disposed around the actuator.

Aspect 14. The adapter aspect 13, wherein the plurality of fastening elements are equidistant from the actuator.

Aspect 15. The adapter aspect 13 or 14, wherein the plurality of fastening elements are disposed with an equal separation along a circle centered at the actuator.

Aspect 16. The adapter of any of aspects 12-15, wherein the actuator is connected to each of the plurality of fastening elements via a respective cable.

Aspect 17. The adapter of aspect 15, wherein rotational movement of the actuator causes the cables to actuate the respective fastening elements and release the payload.

Aspect 18. The adapter of aspect 15, wherein the actuator includes a spring mechanism that maintains tension in each of the cables while the payload is attached.

Aspect 19. The adapter of aspect 18, further comprising a pyrotechnic element that, when activated, causes the actuator to release each of the cables.

Aspect 20. A spacecraft comprising the adapter of aspect 12 and a controller configured to cause the adapter to release the payload when the spacecraft reaches a target orbit.

Aspect 21. A method in a spacecraft for transporting propellant to be consumed by a thruster, the method comprising: storing at least a portion of the propellant within a hollow component that provides structural support to the spacecraft, to thereby increase volumetric efficiency of the spacecraft; and supplying the propellant to the thruster.

Aspect 22. The method of aspect 21, further comprising storing a second portion of the propellant in a dedicated propellant tank fluidicly coupled to the hollow element.

Aspect 23. The method of aspect 22, wherein supplying the propellant to the thruster including pumping the propellant via the dedicated propellant tank.

Aspect 24. The method of any of aspects 21-23, further comprising: storing the at least a portion of the propellant within the hollow component in a solid state, to thereby increase stiffness of the spacecraft during the take-off procedure.

Aspect 25. The method of aspect 24, wherein the hollow component is a portion of a housing of the spacecraft.

Aspect 26. The method of aspect 21, wherein storing the at least a portion of the propellant within the hollow component includes: providing a porous material inside the hollow element; and storing the at least the portion of the propellant in the porous material.

Aspect 27. The method of aspect 21, wherein the propellant is one of (i) water, (ii) hydrozene, (iii) hydrogen peroxide, or (iii) ammonia.

Aspect 28. A spacecraft comprising: a thruster; a propellant tank configured to store a portion of a propellant for consumption by the thruster; and a supporting structure of the spacecraft, the supporting structure including a hollow element fluidicly coupled to the propellant tank, the hollow element configured to store a second portion of the propellant for consumption by the thruster.

Aspect 29. The spacecraft of aspect 28, further comprising a pump coupled to the propellant tank.

Aspect 30. The spacecraft of aspect 28, wherein the supporting structure includes a porous material.

Aspect 31. The spacecraft of aspect 8, where the propellant tank includes a rigid housing to provide additional structural support to the spacecraft.

Aspect 32. The spacecraft of aspect 28, where the propellant tank includes an expandable housing that does not provide structural support to the spacecraft.

Aspect 33. A spacecraft comprising: a thruster; and a propellant tank configured to store propellant for consumption by the thruster, the tank disposed so as to shield one or more electronic components from radiation.

Aspect 34. The spacecraft of aspect 33, wherein the tank is shaped so as to define a cavity in which a payload of the spacecraft is disposed, wherein the payload includes the one or more electronic components, and wherein the spacecraft is configured to deliver the payload to an orbit in space.

Aspect 35. The spacecraft of aspect 34 configured to release the payload from the spacecraft upon reaching the orbit.

Aspect 36. The spacecraft of aspect 33, wherein the one or more electronic components are associated with a control system of the spacecraft.

Aspect 37. The spacecraft of aspect 33, wherein the propellant tank substantially surrounds the one or more electronic components.

Aspect 38. The spacecraft of aspect 33, further comprising: a supporting structure of the spacecraft, the supporting structure including a hollow element fluidicly coupled to the propellant tank, the hollow element configured to store additional propellant for consumption by the thruster and provide additional shielding to the one or more electronic components.

Aspect 39. A spacecraft comprising: a thruster configured to consume propellant to generate thrust; a supporting structure configured to provide structural support to the spacecraft, the structure including one or more beams; and a component configured to store at least a portion of the propellant, the component rigidly coupled to the one or more beams of the supporting structure so that, when the at least a portion of the propellant is in a solid state within the component, the component exerts a force upon the one or more beams to increase a structural strength of the spacecraft.

Aspect 40. The spacecraft of aspect 39, wherein the component is a dedicated propellant tank.

Aspect 41. The spacecraft of aspect 39, wherein the component is a hollow beam included in the supporting structure and fluidicly coupled to a dedicated propellant tank.

Aspect 42. The spacecraft of aspect 39, wherein the propellant includes at least one of (i) water, (ii) hydrozene, (iii) hydrogen peroxide, or (iii) ammonia.

Aspect 43. A spacecraft comprising: a thruster; an expandable propellant tank configured to store propellant for consumption by the thruster; and a biasing element configured to bias the expendable tank toward a compressed state.

Aspect 44. The spacecraft of aspect 43, wherein the biasing element is configured to maintain a substantially constant pressure in the propellant tank as the thruster consumes the propellant.

Aspect 45. The spacecraft of aspect 43, wherein the biasing element includes a spring structure.

Aspect 46. The spacecraft of aspect 43, wherein the expandable propellant has an accordion structure.

Aspect 47. The spacecraft of aspect 43, wherein the expandable propellant tank has an elastic body.

Aspect 48. The spacecraft of aspect 43, wherein the expandable propellant tank is configured to store the propellant in a vaporized state.

Aspect 49. The spacecraft of aspect 43, wherein the expandable propellant tank is substantially insulated to preserve an enthalpy of the propellant.

Aspect 50. The spacecraft of aspect 43, wherein the expandable propellant tank is thermally conductive to radiate a heat from the propellant in a vaporized state.

Aspect 51. The spacecraft of aspect 43, wherein the expandable propellant tank is mounted on an exterior surface of a housing of the spacecraft.

Aspect 52. The spacecraft of aspect 43, wherein the expandable propellant tank is a first expandable propellant tank, the spacecraft further comprising a second expandable propellant tank, wherein the first and the second expandable propellant tanks are symmetrically disposed on opposite sides of the spacecraft.

Aspect 53. The spacecraft of aspect 43, wherein the expandable propellant tank is self-sealing.

Aspect 54. A spacecraft comprising: a thruster; an propellant tank configured to store propellant for consumption by the thruster; and a compressible element disposed in the propellant tank, the compressible element configured to decrease in volume in response to pressure exerted by the propellant changing from a liquid state to a solid state.

Aspect 55. The spacecraft of aspect 54, wherein the compressible element is an elastic ball.

Aspect 56. The spacecraft of aspect 54, wherein the compressible element has an accordion shape.

Aspect 57. A method for attaching a first spacecraft to a second spacecraft, wherein the relative alignment of the attachment may be adjusted to direct the thrust vector of the second spacecraft substantially through the center of mass of the first spacecraft.

Aspect 58. A method for attaching a first spacecraft to a second space service vehicle, wherein the relative alignment of the attachment may be dynamically adjusted as needed to compensate for changes due to flight operations in the mass and mass distribution of the first spacecraft and of the second space service vehicle.

Aspect 59. A method for attaching a first spacecraft to a second spacecraft, wherein the relative alignment of the attachment may be dynamically adjusted to controllably and continuously direct the thrust vector of the second service vehicle away the center of mass of the first vehicle for the purpose of controlling pitch and yaw and/or changing the heading of the coupled vehicles during thrusting events.

Aspect 60. Any of the aspects 57 through 59 including a standard interface between the spacecrafts.

Aspect 61. A system for attaching a first spacecraft to a second spacecraft comprising: an interface surface which may be reversibly attached to the body of a first spacecraft; a system of first and second linear translation mechanisms permanently attached between the interface surface and the body of a space service vehicle which allow for transverse and longitudinal relative motion between the first spacecraft and the second space service vehicle; a system of motor actuators to adjust and hold the relative position of the body of the first space craft with respect to the body of the second space service vehicle; and a system of sensors and controls to adjust the center of mass of the first spacecraft into a desired alignment with the thrust of the second spacecraft.

Aspect 62. A system of Aspect 61 wherein the first and second linear translation mechanisms are pairs of linear rails and where the first pair of rails is aligned at right angle to the second pair of rails.

Aspect 63. Any of the aspects 57-61 where one of the spacecrafts is a space service vehicle.

The invention claimed is:

1. A method of facilitating flight operations, the method comprising:
coupling a payload to a spacecraft via a payload interface;
performing thrusting events;
measuring pitch and yaw of the coupled payload and spacecraft; and
dynamically adjusting the relative alignment of the payload and the spacecraft while the payload remains coupled to the spacecraft, wherein dynamically adjusting the relative alignment of the payload and the spacecraft includes dynamically adjusting the relative alignment during the thrusting events to control the pitch and yaw based at least on the measured pitch and yaw.

2. The method of claim 1, wherein dynamically adjusting the relative alignment of the payload and the spacecraft includes dynamically adjusting the relative alignment to compensate for a change in mass of the spacecraft and/or the payload.

3. The method of claim 1, wherein dynamically adjusting the relative alignment of the payload and the spacecraft includes dynamically adjusting the relative alignment to compensate for a change of mass distribution of the coupled payload and spacecraft.

4. The method of claim 1, wherein dynamically adjusting the relative alignment of the payload and the spacecraft includes dynamically adjusting the relative alignment during the thrusting events to direct thrust provided by the spacecraft substantially through the center of mass of the payload.

5. The method of claim 1, wherein dynamically adjusting the relative alignment of the payload and the spacecraft includes dynamically adjusting the relative alignment to direct a thrust vector of the spacecraft away from the center of mass of the payload.

6. The method of claim 1, wherein dynamically adjusting the relative alignment of the payload and the spacecraft includes dynamically adjusting the relative alignment during the thrusting events to change a heading of the coupled payload and spacecraft.

7. The method of claim 1, wherein the payload interface includes a mounting plate, and wherein dynamically adjusting the relative alignment of the payload and the spacecraft includes moving the mounting plate laterally and/or longitudinally.

8. The method of claim 7, wherein the payload interface further includes a plurality of rails.

9. A system comprising:
a payload interface configured to couple a payload to a spacecraft;
a thruster system configured to perform thrusting events;
sensors configured to measure the pitch and yaw of the coupled payload and spacecraft; and
a control system configured to dynamically adjust a relative alignment of the payload and the spacecraft while the payload remains coupled to the spacecraft, wherein dynamically adjusting the relative alignment of the payload and the spacecraft includes dynamically adjusting the relative alignment during the thrusting events to control the pitch and yaw based on the measured pitch and yaw.

10. The system of claim 9, wherein dynamically adjusting the relative alignment of the payload and the spacecraft includes dynamically adjusting the relative alignment to compensate for a change in mass of the spacecraft and/or the payload.

11. The system of claim 9, wherein dynamically adjusting the relative alignment of the payload and the spacecraft includes dynamically adjusting the relative alignment to compensate for a change of mass distribution of the coupled payload and spacecraft.

12. The system of claim 9, wherein dynamically adjusting the relative alignment of the payload and the spacecraft includes dynamically adjusting the relative alignment during the thrusting events to direct thrust provided by the spacecraft substantially through the center of mass of the payload.

13. The system of claim 9, wherein dynamically adjusting the relative alignment of the payload and the spacecraft includes dynamically adjusting the relative alignment to direct a thrust vector of the spacecraft away from the center of mass of the payload.

14. The system of claim 9, wherein dynamically adjusting the relative alignment of the payload and the spacecraft includes dynamically adjusting the relative alignment during the thrusting events to change a heading of the coupled payload and spacecraft.

15. The system of claim 9, wherein the payload interface includes a mounting plate, and wherein dynamically adjusting the relative alignment of the payload and the spacecraft includes moving the mounting plate laterally and/or longitudinally.

16. The system of claim 15, wherein the payload interface further includes a plurality of rails.

17. A method of facilitating flight operations, the method comprising:

coupling a payload to a spacecraft via a payload interface; and dynamically adjusting the relative alignment of the payload and the spacecraft while the payload remains coupled to the spacecraft, wherein the payload interface includes a mounting plate, and wherein dynamically adjusting the relative alignment of the payload and the spacecraft includes moving the mounting plate laterally and/or longitudinally.

18. A system comprising:

a payload interface configured to couple a payload to a spacecraft; and a control system configured to dynamically adjust a relative alignment of the payload and the spacecraft while the payload remains coupled to the spacecraft, wherein the payload interface includes a mounting plate, and wherein dynamically adjusting the relative alignment of the payload and the spacecraft includes moving the mounting plate laterally and/or longitudinally.

\* \* \* \* \*